United States Patent Office 3,505,061
Patented Apr. 7, 1970

3,505,061
PROCESS OF DESULPHURIZING PIG IRON IN THE REDUCTION OF ORE IN A ROTARY FURNACE
Erik Anders Ake Josefsson, Erik Axel Bengtsson, and Kurt Karl Axel Almqvist, Borlange, Sweden, assignors to Stora Kopparbergs Bergslags Aktiebolag, Falun, Sweden, a company of Sweden
No Drawing. Filed July 8, 1965, Ser. No. 470,566
Claims priority, application Sweden, July 13, 1964, 8,541/64
Int. Cl. C21b 11/06
U.S. Cl. 75—40        10 Claims

ABSTRACT OF THE DISCLOSURE

A process for producing pig iron low in phosphorus and sulfur comprising a dephosphorization step wherein solid carbonaceous matter is floated on a molten basic slag layer over which an oxidizing gas is provided and onto which iron oxide to be refined is fed, the slag layer being maintained so as to contain at least about 3% by weight of iron in the form of iron oxide and at a temperature at less than about 1450° C., removing the slag layer when the phosphorus content of the pig iron therebelow is reduced to a predetermined value, and a desulfurization step wherein a basic slag former is added to reestablish the molten basic slag layer onto which additional carbonaceous matter is floated, said reestablished slag layer being maintained with not more than about 3% by weight of iron in the form of iron oxide and at a temperautre above about 1400° C. until the sulfur content in the pig iron below the slag layer is reduced to less than a predetermined value.

---

This invention relates to the production of pig iron low in phosphorus and sulphur by reducing iron oxides and has for its primary object to make this feasible when the charge, as the reducing agent used, contains considerable amounts of sulphur and, in particular, when using as raw material iron oxide material rich in phosphorus.

At present pig iron is substantially produced in accordance with the blast furnace process, wherein metallurgical coke is used both as a reduction agent and as a heat generator. To a large degree the quality of the pig iron depends upon the phosphorus and sulphur content in the charge. The phosphorus is reduced almost completely in the process and is absorbed in the pig iron, so that only with the advent of the basic steel processes was it possible to effect a dephosphorization necessary for enabling such pig iron to be used in steel manufacture. On reduction of phosphorus rich ores however, the phosphorus content of the pig iron may be so high that it impairs the quality of the steel even in basic steel processes, due to the fact that a sufficiently low phosphorus content could not be attained. For the acid steel processes, only very expensive materials low in phosphorus have been contemplated.

The possibilities of avoiding sulphur absorption in blast furnaces were better, and for basic steel processes the desulphurization, which is already carired out in the blast furnace, has generally been sufficient. The measures which can be adopted in the blast furnace process, in order to promote desulphurization, substantially include firstly maintaining a high basicity of the slag and, secondly to maintain a high temperature at tuyere level, which favors a complete reduction of the iron oxides, and absorption of reduced silicon.

It is also known that it is possible to further improve sulphur purification by tapping the pig iron from the blast furnace into a ladle containing liquid blast-furnace slag. Due to the good mixing action taking place in the tapping operation, the slag is induced to absorb more sulphur.

In the production of pig iron in a basically lined rotary furnace by reduction of finely grained phosphorus bearing ores which are continuously fed to a reaction layer substantially consisting of coke floating on a bath of slag and iron, i.e., in a manner described in Patent No. 3,169,055, it has been proved that by maintaining a certain iron oxide content in the slag within a certain temperature range it is possible to produce a pig iron extremely free of phosphorus. However, it also has been shown that a considerably smaller portion of sulphur can be bound in the slag under such dephosphorizing conditions, and therefore the sulphur content of the iron becomes higher than in the blast furnace process.

In the case of producing pig iron from raw material which contains phosphorus as well as sulphur, it has been possible, according to previous methods, to obtain a pig iron having a low content of either phosphorus or sulphur, but not of both. It thus has been necessary to combine a special process for desulphurization or dephosphorization, as the case may be.

It is now possible, according to this invention, to produce a pig iron having low contents of both phosphorus and sulphur, particularly when using ores relatively poor in phosphorus as a starting material.

For obtaining its objects the invention consists in establishing, during essential periods of the process in a furnace, a layer of molten basic slag and a bed of solid carbonaceous matter, such as coke, floating evenly distributed on top of said slag layer, supplying an oxidizing gas essentially richer in free oxygen than air above said bed to burn carbon monoxide formed in the process, gradually supplying during a first dephosphorizing stage comminuted iron oxide material, such as iron ore, which is rich in phosphorus to said bed, maintaining in said slag at least about 3% by weight of Fe in the form of iron oxide and a temperature not higher than about 1450° C., preferably below 1400° C., by accommodating the depth of said bed within a range of relatively low values to the prevailing other metallurgical conditions comprising the rotational speed of the furnace, the feed of iron oxide material, reckoned as Fe, per unit of time, the grain size of the iron oxide material and the supply of oxidizing gas, accumulating obtained pig iron as a sump below said slag layer, interrupting the process when the pig iron has attained the required percentage of phosphorus, removing the slag now rich in phosphorus, continuing the process in a second desulphurizing stage by supplying to said bed carbonaceous matter and basic slag formers and possibly iron oxide material low in phosphorus, thereby building up a fresh slag layer, maintaining in said fresh slag layer not more than about 3% by weight of Fe in the form of iron oxide and a temperature above 1400° C., preferably above about 1450° C., by accommodating the depth of said bed within a range of relatively high values to the prevailing metallurgical conditions of the kind referred to above, interrupting the process when the pig iron has attained the desired percentage of sulphur, and tapping at least the major portion of the pig iron formed and, preferably, at least the major portion of the slag.

The iron oxide material used as raw material in the first stage may have a higher percentage of phosphorus than would normally provide a pig iron with stipulated low contents thereof. Considerable amounts of sulphur are usually introduced by the carbonaceous matter. Therefore, both dephosphorization and desulphurization are usually needed. In the second stage no iron oxide material needs to be added, the process being then continued only for desulphurizing the charge remaining from the dephosphorization stage. However, if iron oxide material is added in the second stage, it should be so low in phosphorus as not to increase the phosphorus content of the resulting pig iron over that stipulated. In order to make possible that phosphorus also in the second stage may be removed by the slag, or at least not reabsorbed by the pig iron, it may be advisable to use relatively large quantities of slag whereby the phosphorus becomes low enough in percentage to be retained in the slag notwithstanding the unfavorable dephosphorizing conditions. Therefore one can with advantage use an iron ore rich in gangue as raw material, at least in the second stage, because the gangue is usually rich in silica that contributes in making the basic slag low viscous.

The present process is advantageous also when the charge, especially the iron oxide materials, is satisfactorily poor in phosphorus but rich in sulphur, which may come into the charge from the coke used. The first stage may then be modified or more or less abolished.

The pig iron is produced in a rotary furnace, which should be lined with basic or neutral refractory material, by reducing continuously charged ore and by tapping discontinuously with respect to slag and iron. On tapping the iron, a small portion thereof may be advantageously allowed to remain in the furnace to form with a small slag residue a bath on which the reaction layer of coke can float. During the reduction, the furnace is rotated and the ore, which is suitably preheated by using heat of the exhaust gases from the furnace, is charged through an opening in one end wall together with burnt lime and reduction agents—usually coke—on to the reaction layer.

During the first period of the ore reduction process, ore and lime mainly are charged and only to a lesser degree reduction agents. During this part of the reduction process the object is to consume the main portion of the large coke surplus left in the furnace after tapping the previous charge. The content of iron oxide in the slag rises as the depth of the coke bed decreases, and the ability of the slag to bind the phosphorus considerably increases. To increase the ability of the slag to bind the phosphorus, the temperature is kept low, preferably below 1400° C. The magnitude of the portion of the ore demand for a heat which should be added during this part of the reduction depends on the composition of the ore and the analysis requirements, e.g., $P_2O_5/SiO_2$ less than 1%. With an ore relatively poor in phosphorus, the charging of said ore is interrupted when approximately 50% of the total charge for a complete heat has been introduced. The iron content of the slag should then exceed at least 3% and preferably exceed 4%. At this point of the reduction process, the slag is tapped as completely as is practically possible while the coke bed and the pig iron are retained in the furnace.

After tapping the slag, the supply of materials and the reduction are continued but the feed of coke relative to that of ore is now increased, and a considerable excess of coke is built up in the form of a layer on the bath. The contents of iron oxides in the slag are thereby lowered and an increasing amount of the sulphur in the pig iron is transferred to the slag, the sulphur content of which increases considerably. In order to depress the sulphur content to a lower value, no ore should be added during the last 15 minutes of the heat. The temperature during this part of the process should be elevated to at least 1400° C. Moreover, during the last 5–10 minutes, the blowing of oxygen can be interrupted so that only rotation of the furnace is continued. Thereafter the furnace is tapped of both slag and pig iron while the excess of coke is retained in the furnace. However, a small portion of the pig iron may be retained in the furnace in order to support the coke during the continued reduction which then continues as described above.

In the reduction of phosphorus free ores, a simpler method can be used since the first dephosphorizing phase is then generally superfluous. The stipulation of accommodating the coke excess in the furnace is abolished and only one slag tapping operation is necessitated. This need not necessarily be made in conjunction with tapping the iron but may also be carried out when approximately half of the ore has been charged. If additional rotating is undertaken prior to the pig iron being tapped, the slag should be tapped in conjunction with the iron so that as much sulphur as possible is removed.

If ores rich in phosphorus are to be reduced it is necessary, in order to produce a pig iron having low contents of both phosphorus and sulphur, to carry out the reduction process described above in two periods: (1) a dephosphorization with the slag containing at least 3.0, suitably over 4.0% by weight of Fe in the form of iron oxide, and low temperature, preferably under 1400° C.; and (2) another desulphurization period with more strongly reduced slags, i.e., with low oxygen potential and containing at the highest 3.0, and suitably not more than 2.0% by weight of Fe in the form of iron oxide, and at a relatively high temperature, preferably over 1400° C. However, in order to avoid incorporation of significant quantities of reduced phosphorus during the desulphurization, phosphorus rich ore must not be added after the dephosphorizing slag has been tapped. Tapping of this slag should be carried out as completely as possible without allowing the coke layer, which is relatively thin, from following the slag. During the subsequent reduction period, an iron ore oxide raw material is also suitably added in addition to lime and coke, e.g., a phosphorus poor gangue rich ore (30–55% Fe) and/or ferruginous, phosphorus poor, slag forming materials rich in silicate (tailings, sand or the like), whereby the iron content of these materials can be utilized. The additives are necessary so that the amount of slag will be large enough to absorb the sulphur content of the pig iron as well as to enable a large portion of the sulphur to be removed from the system. Tapping of the slag is carried out in conjunction with tapping of the iron while the layer of coke is retained in the furnace. In order to further prevent incorporation of phosphorus during the desulphurizing period, a short period may be inserted before that period after said tapping of phosphorus rich slag during which short period phosphorus poor ore, rich in gangue, is reduced while the coke layer is still kept thin. During this period the phosphorus rich slag remaining from the first period becomes diluted and, when the amount of this slag has been increased to two or three times the original amount, slag is tapped. Thereafter the desulphurizing reduction referred to above is carried out as described. The principles for this dephosphorization and desulphurization will be more closely described in the following examples.

EXAMPLE 1

Iron ore containing 65% Fe as $Fe_3O_4$, 7.20% $SiO_2$, 0.008% P and 0.010% S is reduced with a coke dust, the dry content of which contains 85% C, 4% $SiO_2$, 0.030% P and 0.80% S and an ash content of 10%. A burnt lime with 90% CaO, 3.5% $SiO_2$, 0.020% P and 0.10% S is used for slag formation.

In a 30 ton rotary furnace, 1.5 tons of coke, 2.5 tons of slag and 3.3 tons of pig iron are retained from a previous melting operation on tapping the iron and slag, whereby the coke forms a thick layer on the slag.

During the first stage of the reduction 23 tons of ore, 2.3 tons of lime and 5.5 tons of coke are successively charged during injection of 4,500 Nm.$^3$ (normal cubic meter) oxygen 98% $O_2$. The furnace is rotated at 25 r.p.m. After about 1½ hours, 5.9 tons of slag containing 6.0% FeO, 0.14% S and 0.06% P are tapped off, whilst 2.5 tons are retained together with the thin layer of coke floating on the slag, said coke layer weighing approx. 300–400 kg. At this stage the pig iron contains 3.5% C, 0.001% P and 0.14% S. The temperature on tapping the slag is approx. 1360° C.

During the second reduction stage which takes approx. 2 hours, 23 tons of ore, 2.3 tons of lime and 8.5 tons of coke are successively charged during the injection of 5500 Nm.$^3$ oxygen. During the last 15 minutes no ore is charged and during the last 5 minutes the furnace is rotated without any charging or blowing. The temperature on tapping is approx. 1410° C. 30 tons of pig iron with 4.50% C, less than 0.05% Si, 0.10% Mn, 0.017% P and 0.046% S is tapped off as well as 5.6 tons of slag containing 2.5% FeO, 0.005% P and 0.46% S. Slag basicity on tapping: CaO/SiO$_2$=1.1.

EXAMPLE 2

Iron ore, coke dust, and lime used as a slag former having the same analysis as in Example 1, and also in this case a rotary furnace of 30 tons, are used.

After slag tapping and iron tapping from a previous melting operation, 1.5 tons of coke, 2.5 tons of slag and 3.3 tons of pig iron are left in the furnace. 46 tons of ore, 14 tons of coke dust and 4.6 tons of lime are continuously charged into the furnace whilst it is rotating at 25 r.p.m. and under the injection of oxygen having a content of 98% O$_2$. During this time, 10.000 Nm.$^3$ of oxygen are blown in. During the last 15 minutes coke is charged but no ore and during the last 5 minutes prior to tapping, the furnace is rotated without further charging or injection of oxygen. The temperature prior to tapping is 1410°. The finished pig iron constitutes 30 tons and contains 4.5% C, less than 0.05% Si, 0.1% Mn, 0.026% P and 0.033% S. The tapped slag constitutes 11.2 tons and contains 2.5% FeO, 0.008% P and 0.3% S.

EXAMPLE 3

30.3 tons of ore containing 65% Fe as Fe$_3$O$_4$, 6.9% SiO$_2$, 0.4% P and 0.01% S are reduced in a 30 ton rotary furnace under continuous charging, with the same type of coke dust and with the same type of slag former as in the previous example. At the start of the charging operation 1.5 tons of coke, 2.5 tons of slag and 3.0 tons of pig iron from the previous reduction melt have been left in the furnace. The coke and lime, charged at the same time as the ore—similarly continuously—constitute 7.6 tons and 3 tons, respectively. The furnace rotates at a speed of 25 r.p.m. and 6,000 Nm.$^3$ oxygen are injected. After this reduction process the bath has a temperature of 1360° C. and the formed slag is tapped very carefully. The slag has a basicity (CaO/SiO$_2$) of 1.2 and contains 6.0% FeO, 1.20% P and 0.13% S. The analysis of the pig iron at this stage of the reduction is 3.5% C, less than 0.05% Si, 0.01% Mn, 0.006% P and 0.13% S. After the slag has been tapped 1.5 tons of slag and a thin layer of coke are left in the furnace.

During the continuing stage of reduction, another ore is charged which includes 55% Fe as Fe$_2$O$_3$ and 15.1% SiO$_2$, 0.005% P and 0.01% S whilst remaining charges are of the same type as before. The continuously charged ore forms 18.3 tons whilst corresponding amounts of coke and lime are 6.8 and 3.5 tons, respectively. At the same time 4.400 Nm.$^3$ oxygen are injected. During the last 15 minutes of the reduction, the charging of the ore concentrate is interrupted and after a further 10 minutes both the charging of coke and lime and the injection of oxygen are also interrupted. During the last 5 minutes reduction is thus completed solely by rotation of the furnace (25 r.p.m.). The temperature in the bath when tapping is 1405° C. 30 tons of pig iron are tapped with an analysis of 4.5% C, less than 0.05% Si, 0.1% Mn, 0.063% P and 0.038% S. The simultaneously tapped slag contains 2.0% FeO, 0.019% P and 0.38% S.

EXAMPLE 4

Iron ore containing 60% Fe as Fe$_2$O$_3$, 10.1% SiO$_2$, 0.03% P and 0.01% S was reduced with the same kind of coke dust as used in the previous examples. The same kind of lime was also used.

From the previous heat 1.5 tons of coke, 2.5 tons of slag and 3.0 tons of iron were retained at the tapping of iron and slag. During the dephosphorizing stage of next heat 24.8 tons of ore, 3.3 tons of lime and 6.1 tons of coke were successively supplied to the furnace during simultaneous injection of 5000 Nm.$^3$ oxygen gas containing 98% oxygen.

The furnace was rotated at a speed of 25 r.p.m. The temperature before the first slag tapping is 1360° C. At this stage 8.8 tons of slag containing 6.0% FeO, 0.11% P and 0.13% S were tapped. The coke layer constituting 300 kg. coke is maintained together with 2.0 tons of slag. The pig iron contains at this moment 3.5% C, 0.001% P and 0.13% S. The blowing period of time is 1.7 hours.

During the continued reduction the thickness of the coke layer is increased successively by increasing the feed of coke relative to the addition of ore concentrate and oxygen gas. During this portion 24.8 tons of ore, 3.3 tons of lime and 9.1 tons of coke were supplied and 6000 Nm.$^3$ 98% oxygen were injected. During the last 15 minutes of the blowing the feed of ore was interrupted, while the feed of coke and lime as well as the blowing of oxygen is terminated during the last 5 minutes, while continuing the rotation of the furnace. The temperature before the tapping of slag and iron is 1415° C. The thick layer of coke comprising 1500 kg. coke is maintained together with 2.5 tons of slag, while 7.7 tons of slag containing 2.5% FeO, 0.011% P and 0.40% S are tapped. The tapped iron constitutes 30 tons containing 4.5% C, 0.02% Si, 0.10% Mn, 0.035% P and 0.038% S. The slag basicity, expressed as the ratio CaO/SiO$_2$ has been 1.1 during both the dephosphorizing and the desulphurizing stage.

EXAMPLE 5

In a 30 ton rotary furnace ore containing 65% Fe$_3$O$_4$, 6.9% SiO$_2$, 0.4% P and 0.01% S was reduced during succesive feed of the ore and with the same kind of coke dust and slag formers as in previous examples. From the preceding heat 1.5 tons of coke, 2.5 tons of slag and 3.0 tons of pig iron remain in the furnace. During the first period of the reduction the greater portion of the excess of coke is consumed involving a depreciation from about 1500 kg. to about 300 kg. At this period 25.8 tons of ore, 2.7 tons of lime and 6.1 tons of coke were fed. The furnace is rotated with 25 r.p.m. and 5100 Nm.$^3$ 98% oxygen gas is injected. The basicity CaO/SiO$_2$ of the formed slag is 1.2 and the slag contains 6.0% FeO, 1.14% P and 0.13% S. The iron has at this time the following composition: 3.5% C, 0.01% Si, 0.01% Mn, 0.006% P and 0.129% S. The temperature is 1350° C. A careful tapping of slag is performed and 1500 kg. slag are maintained in the furnace in addition to the coke layer comprising about 300 kg. coke.

During the continued reduction an ore free of phosphorus and rich in gangue and containing 55% Fe as Fe$_2$O$_3$, 15.1% SiO$_2$, 0.005% P and 0.01% S was added. Reduction agents and slag formers are of the same kind as above. After successive supply of 5.5 tons of ore, 1.1 tons of lime and 1.6 tons of coke and injection of 1200 Nm.$^3$ oxygen gas a careful slag tapping is performed anew. The excess of coke, about 300 kg. is maintained together with 1500 kg. slag. The temperature is 1360° C. and the tapped slag contains 6.0% FeO, 0.462% P and 0.12% S. The iron contains 3.5% C, 0.01% Si, 0.01% Mn, 0.002% P and 0.123% S. The basicity CaO/SiO$_2$ is 1.2.

After this second slag tapping the reduction of the above mentioned gangue-rich ore holding 55% Fe is continued. The additions during this period are 18.3 tons of ore, 3.5 tons of lime and 6.8 tons of coke. At the same time 4,400 Nm.$^3$ oxygen gas are injected. During the last 15 minutes of the reduction the feed of ore concentrate is terminated, while the feed of coke and lime is continued for further 10 minutes. During the last 5 minutes the furnace is rotated without feed and blowing. The temperature at tapping is 1405° C. 30 tons of pig iron are tapped having an analysis of 4.50% C, 0.02% Si, 0.1% Mn, 0.030% P and 0.037% S. The slag tapped simultaneously contains 2.0% FeO, 0.009% P and 0.37% S. The slag basicity $CaO/SiO_2$ is 1.1.

We claim:

1. A process for the production of pig iron low in phosphorus and sulfur in a rotary furnace which comprises: establishing in said furnace a layer of basic molten slag; floating a bed of solid carbonaceous matter on said slag layer; supplying an oxidizing gas substantially richer in free oxygen than air above said bed to burn carbon monoxide formed during said process; supplying iron oxide in a feed relatively rich in phosphorus to said bed; maintaining in said slag layer at least about 3% by weight of Fe in the form of iron oxide and the temperature of said layer at less than about 1450° C.; accumulating pig iron below said slag layer; removing substantially all of the phosphorus-rich slag layer when the phosphorus content of said pig iron is below a predetermined value; supplying a basic slag former to reestablish said molten basic slag layer; supplying carbonaceous matter to said bed; maintaining in said reestablished slag layer not more than about 3% by weight of Fe in the form of iron oxide and the temperature of said layer at above about 1400° C.; accumulating pig iron below said slag layer; and tapping a major portion of the pig iron accumulated when the sulfur content of said pig iron is reduced below a predetermined value.

2. A process as defined in claim 1 which further comprises supplying an iron oxide relatively low in phosphorus to said bed after reestablishing said molten basic slag layer.

3. A process as defined in claim 1 wherein said first-mentioned slag layer is maintained at a temperature below about 1400° C.

4. A process as defined in claim 1 wherein said reestablished slag layer is maintained at a temperature above about 1450° C.

5. A process as defined in claim 1 which further comprises tapping a major portion of said reestablished slag layer when said pig iron is tapped.

6. A process as defined in claim 1 wherein said Fe in said first-mentioned slag layer is maintained at above about 4%.

7. A process as defined in claim 1 wherein said Fe in said reestablished slag layer is maintained at less than about 2%.

8. A process as defined in claim 1 wherein said carbonaceous matter is coke and said basic slag is lime.

9. A process as defined in claim 1 wherein no iron oxide is added during about the last 15 minutes of the heat nad no oxidizing gas is supplied during about the last 10 minutes of the heat.

10. A process as defined in claim 1 wherein said iron oxide supplied is iron ore.

References Cited

UNITED STATES PATENTS

| | | | |
|---|---|---|---|
| 1,435,686 | 11/1922 | Basset | 75—40 |
| 1,863,622 | 6/1932 | Davis | 75—40 |
| 2,185,911 | 1/1940 | Eulenstein et al. | 75—40 |
| 3,169,055 | 2/1965 | Josefsson et al. | 75—40 |

HENRY W. TARRING II, Primary Examiner